US010084308B1

(12) United States Patent
Chen et al.

(10) Patent No.: US 10,084,308 B1
(45) Date of Patent: Sep. 25, 2018

(54) OVERCURRENT PROTECTION DEVICE

(71) Applicant: FUZETEC TECHNOLOGY CO., LTD., New Taipei (TW)

(72) Inventors: Jack Jih-Sang Chen, New Taipei (TW); Chang-Hung Jiang, New Taipei (TW)

(73) Assignee: FUZETEC TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/623,190

(22) Filed: Jun. 14, 2017

(51) Int. Cl.
*H01C 7/02* (2006.01)
*H02H 9/02* (2006.01)

(52) U.S. Cl.
CPC ............... *H02H 9/026* (2013.01); *H01C 7/02* (2013.01)

(58) Field of Classification Search
CPC ...... H01C 1/1406; H01C 1/144; H01C 7/027; H01C 17/0652; H01C 17/06566
USPC ........................................................ 338/22 R
See application file for complete search history.

(56) References Cited

U.S. PATENT DOCUMENTS 4,238,812 A * 12/1980 Middleman .......... A01K 63/065 219/505
4,591,700 A * 5/1986 Sopory .................. H01C 7/027 219/505
5,303,115 A * 4/1994 Nayar .................... H02H 9/026 361/106
6,597,551 B2 * 7/2003 Heaney ................ H01C 1/1406 338/22 R
8,508,328 B1 * 8/2013 Chen ...................... H01C 7/028 338/13
9,147,509 B2 * 9/2015 Chu ..................... H01C 1/1406
9,646,746 B2 * 5/2017 Das ........................ H01C 7/028
2005/0030689 A1 * 2/2005 Toth ..................... H01C 1/1406 361/103
2007/0025044 A1 * 2/2007 Golubovic ............. H01C 7/102 361/124
2008/0187649 A1 * 8/2008 Galla ....................... H01B 1/22 427/58

* cited by examiner

*Primary Examiner* — Kyung Lee
(74) *Attorney, Agent, or Firm* — Christensen O'Connor Johnson Kindness PLLC

(57) ABSTRACT

An overcurrent protection device includes a polymer positive temperature coefficient (PPTC) component and two pins. The PPTC component includes a positive temperature coefficient (PTC) element having two opposite surfaces, and two electrodes respectively connected to the surfaces of the PTC polymeric element. The two pins are respectively connected to the electrodes and extend in an extending direction. Each of the pins has a cross-sectional area that is perpendicular to the extending direction and greater than or equal to 0.8 mm$^2$. The overcurrent protection device has an average trip current and an average work current, where the ratio of the average trip current to the average work current is less than 1.5.

6 Claims, 1 Drawing Sheet

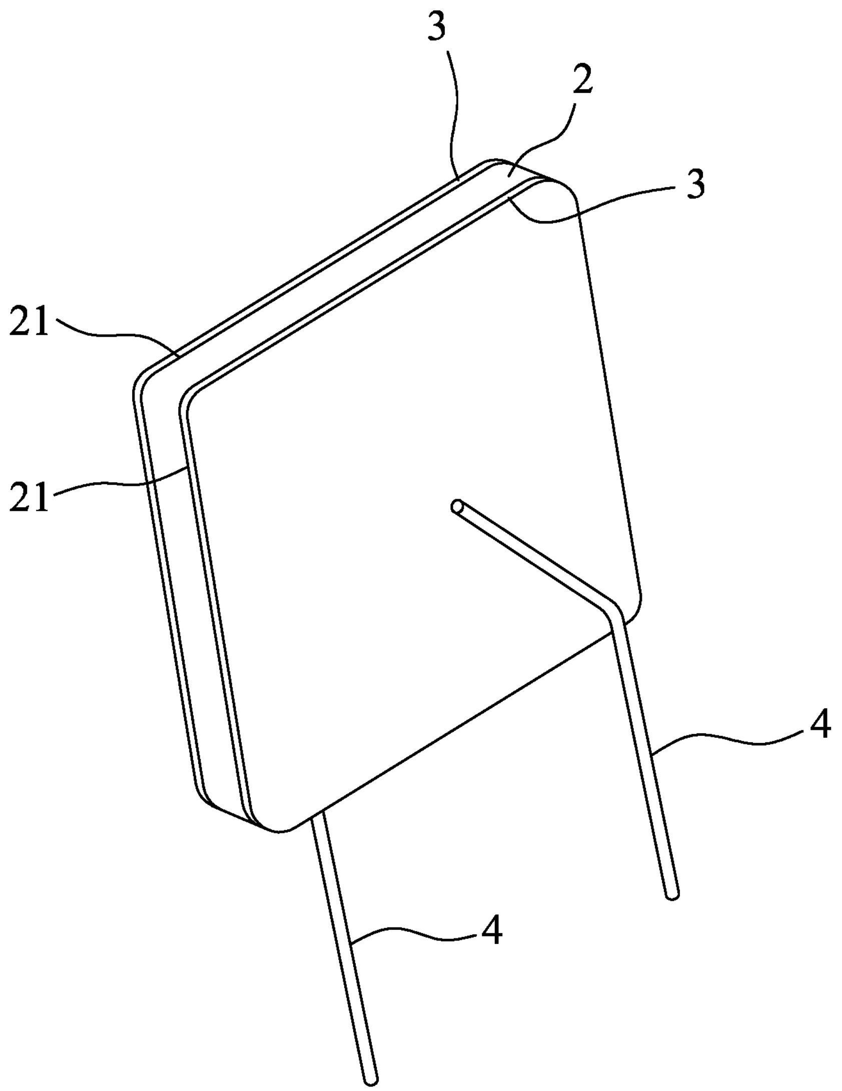
3
2
3
21
21
4
4

OVERCURRENT PROTECTION DEVICE

FIELD

This disclosure relates to an overcurrent protection device, more particularly to an insertable overcurrent protection device including lead pins.

BACKGROUND

U.S. Pat. No. 4,238,812 discloses an overcurrent protection device that includes a positive temperature coefficient (PTC) element having two opposite surfaces, two electrodes respectively connected to the surfaces of the PTC element, and two pins respectively connected to the electrodes. The positive temperature coefficient element is made of a polymeric material containing a conductive filler.

Typically, the pins of the overcurrent protection device described above are usually solid circular wires that are made of tinned copper (9.5 wt % of tin and 90.5 wt % of copper, having a thermal conductivity of 369.27 W/mK) and that each has a cross-sectional area of 0.205 mm$^2$ (24 AWG, diameter of 0.511 mm).

The ratio of the trip current to the work current of the overcurrent protection device is usually set in the range of 2.0±0.2. However, the overcurrent protection device with the ratio of 2.0±0.2 would not be suitable for various apparatus if circuits of the apparatus were to be destroyed upon the trip current reaching two times the work current.

SUMMARY

Therefore, an object of the present disclosure is to provide an overcurrent protection device that can overcome the aforesaid drawbacks associated with the prior art.

According to this disclosure, the overcurrent protection device includes a polymer positive temperature coefficient (PPTC) component and two pins. The PPTC component includes a positive temperature coefficient (PTC) element having two opposite surfaces, and two electrodes respectively connected to the surfaces of the PTC polymeric element. The two pins are respectively connected to the electrodes and extend in an extending direction. Each of the pins has a cross-sectional area that is perpendicular to the extending direction and that is greater than or equal to 0.8 mm$^2$. The overcurrent protection device has an average trip current and an average work current, where the ratio of the average trip current to the average work current is less than 1.5.

BRIEF DESCRIPTION OF THE DRAWINGS

Other features and advantages of the disclosure will become apparent in the following detailed description of the embodiment with reference to the accompanying drawing, of which:

FIG. 1 is a schematic view of the embodiment of an overcurrent protection device according to this disclosure.

DETAILED DESCRIPTION

FIG. 1 illustrates the embodiment of an overcurrent protection device that includes a polymer positive temperature coefficient (PPTC) component and two pins 4. The overcurrent protection device may be an insertable overcurrent protection device, e.g., radial leaded devices (RLDs).

The PPTC component includes a positive temperature coefficient element 2, and two electrodes 3. The positive temperature coefficient element 2 has two opposite surfaces. The two electrodes 3 are respectively connected to the surfaces of the PTC polymeric element 2. The two pins 4 are respectively connected to the electrodes 3 and extend in an extending direction. Each of the pins 4 has a cross-sectional area that is perpendicular to the extending direction and that is greater than or equal to 0.8 mm$^2$. The overcurrent protection device has an average trip current and an average work current, where the ratio of the average trip current to the average work current is less than 1.5.

In certain embodiments, the cross-sectional area of each of the pins 4 ranges from 0.8 mm$^2$ to 1.1 mm$^2$.

In this embodiment, each of the pins 4 is a solid round wire and has a circular cross section. In certain embodiments, the cross-sectional shape of each of the pins 4 is not limited to a circular shape, and may be triangular, quadrangular, or any other shape. The cross sections of the two pins may be different in shape.

The pins 4 are made of a conductive material, e.g., metal. Each of the pins 4 may have a composite structure which includes components with different thermal conductivity. In certain embodiments, the pins 4 are independently a tinned copper pin or a tinned copper clad steel pin.

In certain embodiments, the PTC polymeric element 2 includes a polymer matrix and a particulate conductive filler dispersed in the polymer matrix. The polymer matrix includes a non-grafted olefin-based polymer.

In certain embodiments, the polymer matrix further includes a carboxylic acid anhydride-grafted olefin-based polymer. The carboxylic acid anhydride-grafted olefin-based polymer may be maleic anhydride-grafted olefin-based polymer. In this embodiment, the carboxylic acid anhydride-grafted olefin-based polymer is maleic anhydride-grafted high density polyethylene (HDPE).

In certain embodiments, the non-grafted olefin-based polymer is HDPE.

Examples of the particulate conductive filler include carbon black powder, metal powder, electrically conductive ceramic powder, and combinations thereof The disclosure will be further described by way of the following examples and comparative example. However, it should be understood that the following examples and comparative example are solely intended for the purpose of illustration and should not be construed as limiting the disclosure in practice.

EXAMPLE

Example 1 (E1)

12.75 grams of HDPE (purchased from Formosa plastic Corp., catalog no.: HDPE9002) serving as the non-grafted olefin-based polymer, 12.75 grams of maleic anhydride grafted olefin-based polymer (purchased from Dupont, catalog no.: MB100D) serving as the carboxylic acid anhydride-grafted olefin-based polymer, 24.5 grams of carbon black particles (trade name: Raven 430UB, commercially available from Columbian Chemicals Company) serving as the particulate conductive filler were compounded in a Brabender mixer. The compounding temperature was 200° C., the stirring rate was 30 rpm, and the compounding time was 10 minutes.

The compounded mixture was hot pressed so as to form a thin sheet of the polymer positive coefficient (PTC) element 2 having a thickness of 0.53 mm. The hot pressing temperature was 200° C., the hot pressing time was 4 minutes, and the hot pressing pressure was 80 kg/cm$^2$.

Two copper foil sheets (serving as the electrodes 3) were respectively attached to two opposite surfaces of the thin sheet and were hot pressed under 200° C. and 80 kg/cm$^2$ for 4 minutes to form a sandwiched structure of a PTC laminate. The PTC laminate was cut into a plurality of test samples with a size of 8.8 mm×8.8 mm, and each test sample was irradiated by a cobalt-60 source for a total radiation dose of 150 kGy.

Two pins 4 were respectively connected to the copper foil sheets of a respective one of the test samples using a solder material, so as to forma small sized insertable over-current protection device. Each of the pins 4 is a solid round tinned copper wire, has a composition containing 9.5 wt % tin and 90.5 wt % copper, and has a diameter of 1.02 mm (18 AWG), a cross-sectional area of 0.817 mm$^{2}$' and a thermal conductivity of 369.27 W/mK.

Each of the pins 4 has an extension portion that extends away from and that is not in contact with the PPTC component. The average resistance of the test sample was determined at a position of the extension portions of the pins 4 away from the PPTC component by 10 mm, and the results are shown in Table 1.

Example 2 (E2)

The procedures and conditions in preparing the test samples of Example 2 (E2) were similar to those of Example 1, except that each pin has a diameter of 1.15 mm (17 AWG), and a cross-sectional area of 1.038 mm$^2$. The electrical properties of the test samples of Example 2 were determined, and the results are shown in Table 1.

Comparative Examples 1-4 (CE1-CE4)

The procedures and conditions in preparing the test samples of Comparative Examples 1-4 (CE1-CE4) were similar to those of Example 1, except for the diameter of the pin.

The cross-sectional areas of the pins used in Comparative Examples 1-4 (CE1-CE4) were 0.205 mm$^2$ (diameter of 0.511=), 0.325=$^2$ (diameter of 0.643=), 0.519=$^2$ (0.813 mm) and 0.653=$^2$ (0.912 mm), respectively. The electrical properties of the test samples of Comparative Examples 1-4 were determined, and the results are shown in Table 1.

Performance Tests

Work Current Test

The test samples of each of E1-E2 and CE1-CE4 were subjected to a work current test to determine the average work current of the test samples of each of E11-E2 and CE1-CE4.

The work current test was conducted under 60V of DC voltage for 15 minutes without causing it to trip under 25° C. The test results are shown in Table 1.

Time-to-Trip Test

The test samples of each of E1-E2 and CE1-CE4 were subjected to a time-to-trip test to determine the trip time of each of the test samples at different trip currents. The trip time was determined at a position of the extension portions of the pins 4 away from the PPTC component by 10 mm. The trip time is defined as the time the test sample takes to trip at a selected trip current under a fixed voltage. The time-to-trip test was conducted under 60 V of DC voltage at 25*t*. The trip current at the trip time of 20 seconds was calculated by interpolation. The average trip current of the test samples of each of E1-E2 and CE1-CE4 at the trip time of 20 seconds are listed in Table 1.

Ratio of the Average Trip Current to the Average Work Current

The ratio of the average trip current to the average work current of each of E1-E2 and CE1-CE4 was calculated and is shown in Table 1.

TABLE 1

| | Diameter of pin | | Cross-sectional area of pin | Average Resistance | Voltage | Average work current | Average trip current | Ratio of the average trip current to the average |
|---|---|---|---|---|---|---|---|---|
| | (mm) | (AWG) | (mm$^2$) | (Ω) | (V) | (A) | (A) | work current |
| E1 | 1.020 | 18 | 0.817 | 0.271 | 60 | 1.40 | 2.09 | 1.49 |
| E2 | 1.150 | 17 | 1.038 | 0.272 | 60 | 1.50 | 2.22 | 1.48 |
| CE1 | 0.511 | 24 | 0.205 | 0.273 | 60 | 0.90 | 1.75 | 1.94 |
| CE2 | 0.643 | 22 | 0.325 | 0.272 | 60 | 1.10 | 2.22 | 2.02 |
| CE3 | 0.813 | 20 | 0.519 | 0.272 | 60 | 1.10 | 2.25 | 2.05 |
| CE4 | 0.912 | 19 | 0.653 | 0.272 | 60 | 1.20 | 2.33 | 1.94 |

It is shown from Table 1 that the ratio of the average trip current to the average work current of CE1-CE4 (1.94 to 2.03) is significantly higher than that of E1 and E2 (1.49 and 1.48). It is indicated that an increase in the cross-sectional areas of the pins to a value that is greater than or equal to 0.8 mm$^2$ would unexpectedly decrease the ratio of the average trip current to the average work current and provide superior heat dissipation effect.

In conclusion, with each of the pins 4 having a cross-sectional area that is greater than or equal to 0.8 mm$^2$, the overcurrent protection device of the present disclosure may be used in apparatus that require a lower ratio (less than 1.5) of the average trip current to the average work current.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An overcurrent protection device comprising:

a polymer positive temperature coefficient (PPTC) component that includes a positive temperature coefficient (PTC) polymeric element having two opposite surfaces, and two electrodes respectively connected to said surfaces of said PTC polymeric element; and two pins respectively connected to said electrodes and extending in an extending direction, each of said pins having a cross-sectional area that is perpendicular to the extending direction and that is greater than or equal to 0.8 $mm^2$;

wherein said overcurrent protection device has an average trip current and an average work current, the ratio of said average trip current to said average work current being greater than 0 and less than 1.5;

wherein said PTC polymeric element includes a polymer matrix and a particulate conductive filler dispersed in said polymer matrix, said particulate conductive filler being carbon black powder.

2. The overcurrent protection device as claimed in claim 1, wherein said cross-sectional area of each of said pins ranges from 0.8 $mm^2$ to 1.1 $mm^2$.

3. The overcurrent protection device as claimed in claim 1, wherein each of said pins is one of a tinned copper pin and a tinned copper clad steel pin.

4. The overcurrent protection device as claimed in claim 1, wherein said polymer matrix includes a non-grafted olefin-based polymer.

5. The overcurrent protection device as claimed in claim 4, wherein said polymer matrix further includes a carboxylic acid anhydride-grafted olefin-based polymer.

6. The overcurrent protection device as claimed in claim 4, wherein said non-grafted olefin-based polymer is high density polyethylene.

* * * * *